United States Patent [19]

Feldinger

[11] Patent Number: 5,244,011
[45] Date of Patent: Sep. 14, 1993

[54] CONTROL VALVE

[76] Inventor: Edgar Feldinger, 12/37 Yoseftal Street, Kiryat Yam, Israel

[21] Appl. No.: 805,062

[22] Filed: Dec. 11, 1991

[30] Foreign Application Priority Data

Dec. 23, 1990 [IL] Israel .................................... 96766

[51] Int. Cl.⁵ ............................................. F16K 31/44
[52] U.S. Cl. ............................ 137/614.13; 137/614.11; 137/862
[58] Field of Search ................... 137/614.11, 614.13, 137/614.14, 883, 887, 861, 862, 871, 614.21, 312, 315; 251/58

[56] References Cited

U.S. PATENT DOCUMENTS

| | | | |
|---|---|---|---|
| 2,831,498 | 4/1958 | Thomsen | 137/614.14 X |
| 3,202,165 | 8/1965 | Yavicoli | 137/614.13 X |
| 3,411,526 | 11/1968 | Schaefer | 137/312 |
| 3,586,034 | 6/1971 | Karzeniowski | 137/312 |
| 3,749,358 | 7/1973 | Bates . | |
| 3,876,179 | 4/1975 | Baumann . | |
| 3,913,603 | 10/1975 | Torres | 137/614 X |

FOREIGN PATENT DOCUMENTS

| | | |
|---|---|---|
| 597 | 8/1877 | Fed. Rep. of Germany . |
| 350071 | 10/1920 | Fed. Rep. of Germany ............ 137/614.11 |
| 608182 | 7/1926 | France . |

OTHER PUBLICATIONS

Document by Dannemann entitled "Control valves--elements of the pipeline and the automation equipment", dated Apr. 4, 1985, 16 pages, labelled Exhibit A.

Primary Examiner—Martin P. Schwadron
Assistant Examiner—Kevin L. Lee
Attorney, Agent, or Firm—Merchant, Gould, Smith, Edell, Welter & Schmidt

[57] ABSTRACT

A fluid control valve including a housing defining a fluid inlet and a fluid outlet, and two eccentrically and rotatably mounted, oppositely disposed plug elements arranged for selective sealing of the inlet and outlet, the plug elements being coupled to a stem arranged to move in a direction perpendicular to the fluid flow for simultaneous pivoting of the plug elements.

6 Claims, 7 Drawing Sheets

CONTROL VALVE

FIELD OF THE INVENTION

The present invention relates to fluid control valves, especially those operational at high differential pressures and high temperatures.

BACKGROUND OF THE INVENTION

A control valve is a fundamental component in fluid conduction systems, whose applications vary from pressure reduction, cooling, phase separating, emergency relief and double block and bleed, to regulation and control of the fluid conduction. Typically, the valve is required to be capable of sealing a fluid flow line across a pressure drop and permitting fluid flow therethrough as required. The differential pressure between upstream and downstream could be enormous, up to as much as 200 bar. On the other hand, the very same valve might be required to operate at a much lower differential pressure when the same system is operating in another mode. Similarly, the temperatures of the fluid in such a system could range from below 0° C. to 580° C.

Control valves for use at high differential pressure are known in the art. These include butterfly valves, V-ball valves and globe valves. These valves suffer from a number of disadvantages. Many are unable to function at high pressure differentials. Others are sensitive to high temperatures. Generally, these valves start to leak after several months.

One suggested solution is the "Camflex" valve, manufactured by Masoneilan of Dresser Industries, Inc., U.S.A., which comprises an eccentric rotating plug for sealing the inlet into the valve. The plug is actuated by a spring-opposed rolling diaphragm actuator coupled to the plug by a rotatable cam, thus providing a multiplication of forces for sealing the plug.

The Camflex suffers from the disadvantage that, due to the actuation of the cam, a relatively massive actuator is required to overcome the opposed torque resulting from the differential pressure of the flow. As a consequence, the Camflex is limited as to the differential pressure under which it is operative.

SUMMARY OF THE INVENTION

It is an object of the invention to provide a high differential pressure control valve operative over a wide range of differential pressures which overcomes the disadvantages of the prior art.

One object of the invention is to provide a valve capable of sealing the passage of fluid under high differential pressures and at a wide range of temperatures, adaptable to various viscosities of fluid.

A further object is to provide a valve which produces a minimal pressure drop when direct flow through the valve is demanded, which requires easy maintenance, which is durable under erosive conditions and which requires a small power supply or driving means for actuation.

Yet another object is to provide a valve suitable for separating gas and liquid phases, and operating as a cooling valve, reducer valve, emergency valve, double block and bleed, regulation or control valve.

There is thus provided, in accordance with the present invention, a fluid control valve comprising a housing defining a fluid inlet and a fluid outlet, and two eccentrically and rotatably mounted, oppositely disposed plug elements arranged for selective sealing of the inlet and outlet, the plug elements being coupled to a stem arranged to move linearly in a direction perpendicular to the fluid flow for simultaneous pivoting of the plug elements.

According to a preferred embodiment, the plug elements comprise a generally convex surface adapted to close the corresponding inlet and outlet. Each plug element is pivotally coupled to the housing adjacent the corresponding inlet and outlet for closing and opening the inlet and outlet.

Further according to a preferred embodiment, the plug elements are coupled to the stem via adjustable couplings pivotably mounted to the stem such that, when the plug elements close the inlet and outlet, the angle between the axis of a coupling element and the axis of the stem is preferably less than about 45°.

According to a preferred embodiment, the plug defines an aerodynamic shape which reduces erosion and increases sealing.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a control valve arranged to be coupled in a high pressure and high temperature fluid flow line. This control valve is particularly suited for use in flow lines having a with flows at temperatures ranging from about −30° C. to about 580° C. The control valve includes two rotatable, eccentrically mounted, oppositely disposed plug elements coupled to a stem arranged to move linearly in a direction perpendicular to the fluid flow for simultaneous opening or closing of the plug elements.

It is a particular feature of the present invention that the valve is capable of providing pressure reduction in the fluid flow passage under differential pressures ranging to about 200 bar and at fluid temperatures ranging from about −30° C. to about 580° C. in only two steps. Standard leakage classifications conform to ANSI B16.104 Class IV and better. The valve is operative with fluids of varying viscosities, so can be utilized in a wide variety of installations, and may be operative with both directions of fluid flow. This can be desirable because, after wear due to fluid flow in one direction, the valve can be removed and recoupled in the opposite direction in the fluid flow line, effectively doubling its useful life.

It is a further advantage of the present invention that the flow capacity through the valve is double that of conventional valves of the same size. Furthermore, the valves of the invention seal at the highest degree of sealing under standard ANSI B16-104.

Figure 1:
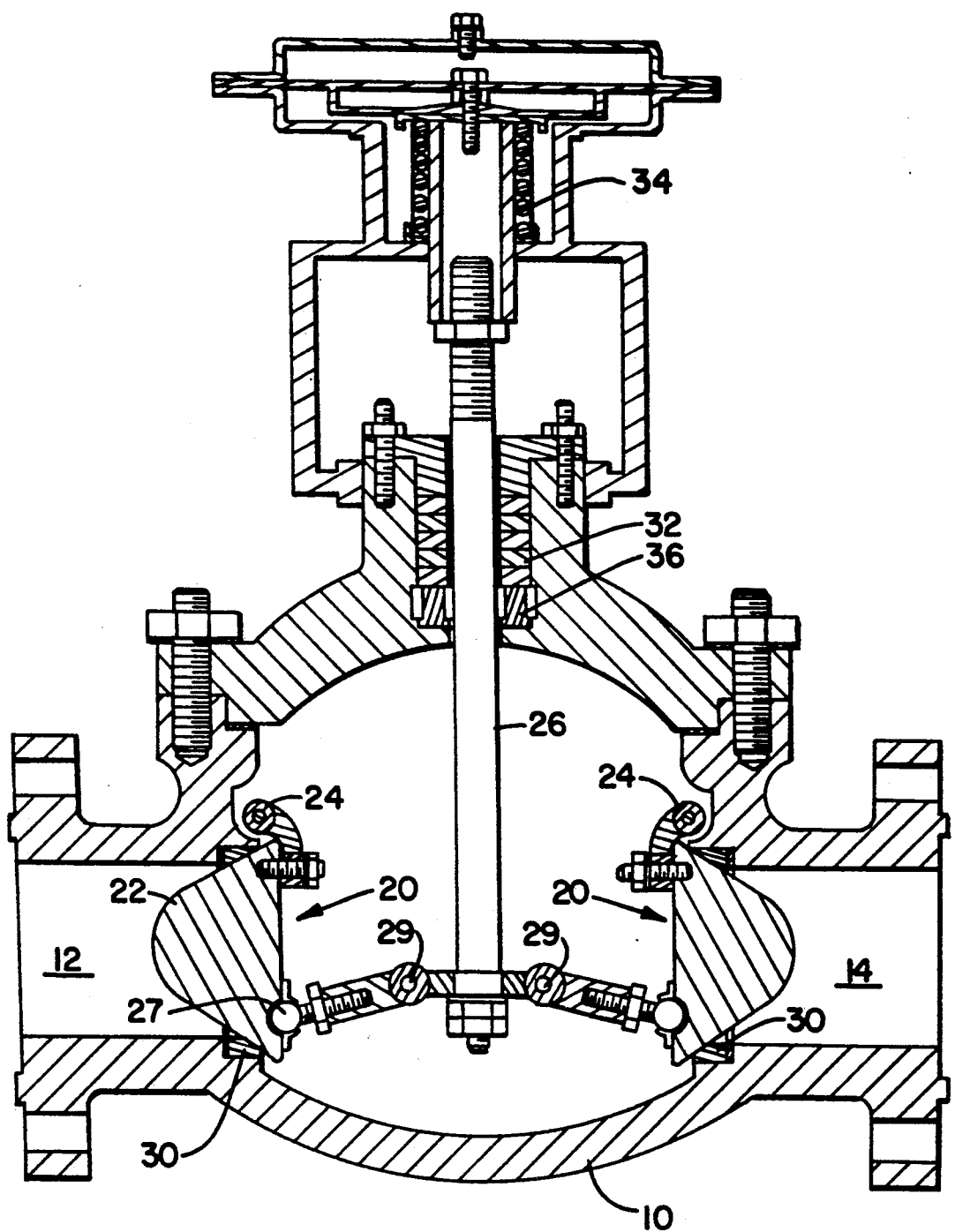
FIG. 1 is a schematic sectional illustration of a control valve constructed and operative in accordance with an embodiment of the present invention in the closed orientation.

Referring to FIG. 1 there is shown a sectional illustration of a control valve constructed and operative in accordance with one embodiment of the present invention and comprising a housing 10. Housing 10 defines a fluid inlet 12 and a fluid outlet 14 with an expansion chamber 16 between the inlet and the outlet. Disposed for sealing engagement in each of inlet 12 and outlet 14 is a plug assembly 20.

Each of plug assemblies 20 comprises a hard metal plug 22 pivotably affixed at one side thereof to housing 10 about an axis 24. The opposite side is coupled as by coupling means 28 to a stem 26. Coupling means 28 are pivotably coupled to plug 22 as by a ball joint 27, and are pivotably coupled to the stem 26 about a rotation axis 29. Preferably, coupling means 28 are adjustable in length.

Plug 22 defines an aerodynamic shape which produces laminar flow therealong during fluid flow through the valve, thereby avoiding turbulent flow and reducing erosion. The center of the plug 22 is convex.

According to a preferred embodiment, metal sealing rings 30 are provided at inlet 12 and outlet 14 and serve as valve seats for plugs 20. Coupling means 28 can be adjusted periodically to ensure a sealing fit between the plug 22 and the sealing ring 30 taking into account wear due to fluid flow. Furthermore, ring 30 is preferably removable for ease of replacement with access from inside the valve itself, without the need to remove the valve from the line in which it is installed. This is not possible in conventional valves which require removal of the valve.

Stem 26 is mounted for linear movement in housing 10. Suitable packing 32, such as graphite tape, is preferably provided to seal the passageway of the stem into the expansion chamber 16. Stem 26 may be actuated in any known manner, here illustrated as a spring biased actuating mechanism 34. It is a particular feature in that, due to the balance of forces explained hereinbelow, a relatively small force is required to open and close the valve. Thus, the actuating mechanism can be of simple construction requiring little power.

According to one embodiment, means 36 to prevent rotation of stem 26 about its longitudinal axis is provided. Such means 36 may constitute a groove in the stem with a complementary protrusion in the housing or sealing means, or any other arrangement preventing rotation.

As shown in FIG. 1, preferably the stem and stem actuating means comprise a separate part of the housing affixed in such a way as to define the expansion chamber 16 between the inlet and the outlet. This permits easy access to all parts of the valve for maintenance purposes.

Operation of the control valve of FIG. 1 will now be described with additional reference to FIG. 3. When the valve is closed, the inlet pressure P1 is greater than the pressure P2 in the expansion chamber 16 which, in turn, is greater than the pressure P3 at the outlet. It is a particular feature of the present invention that provision of two valves with an expansion chamber between results in lower differential pressure acting on each of the plugs or valves than in the case of a single valve, which is a significant advantage as regards the force required to open or close the plugs.

Furthermore, plug 22 is urged into the sealing orientation at two points therealong—both by coupling means 28 and the coupling at axis 24. Thus axis 24 provides both an axis about which plug 22 pivots and a counterforce to the fluid pressure F1.

It will be appreciated that the closure of plugs 22 is more efficient (i.e., requires less actuating force) the greater the moment created on plug 22. Thus, axis 24 is preferably located far from ball joint 27. However, this is not required. It is only necessary that there be two points of attachment on the plug—one to the housing for eccentric pivoting, and the other to the stem 26.

Figure 2:
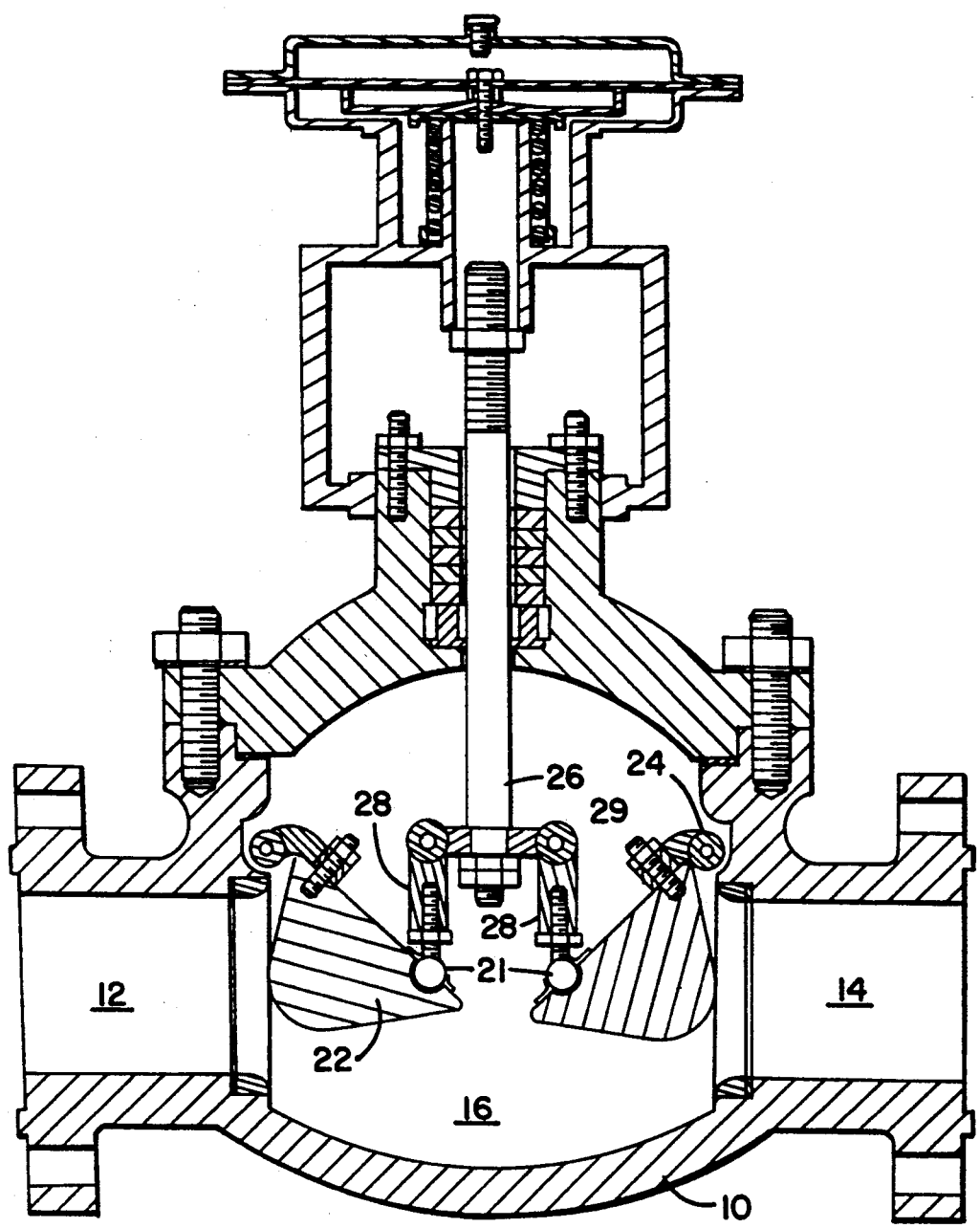
FIG. 2 is a sectional illustration of the valve of FIG. 1 in an open orientation.

When it is desired to open the valve, actuating mechanism 34 is activated, causing stem 26 to be translated linearly parallel to its longitudinal axis, with concomitant movement of coupling means 28. Mechanism 34 can be activated either automatically or manually. As coupling means 28 move, plugs 22 are pivoted about their ball joints and about axis 24 into an open orientation, such as that shown in FIG. 2.

Figure 3:
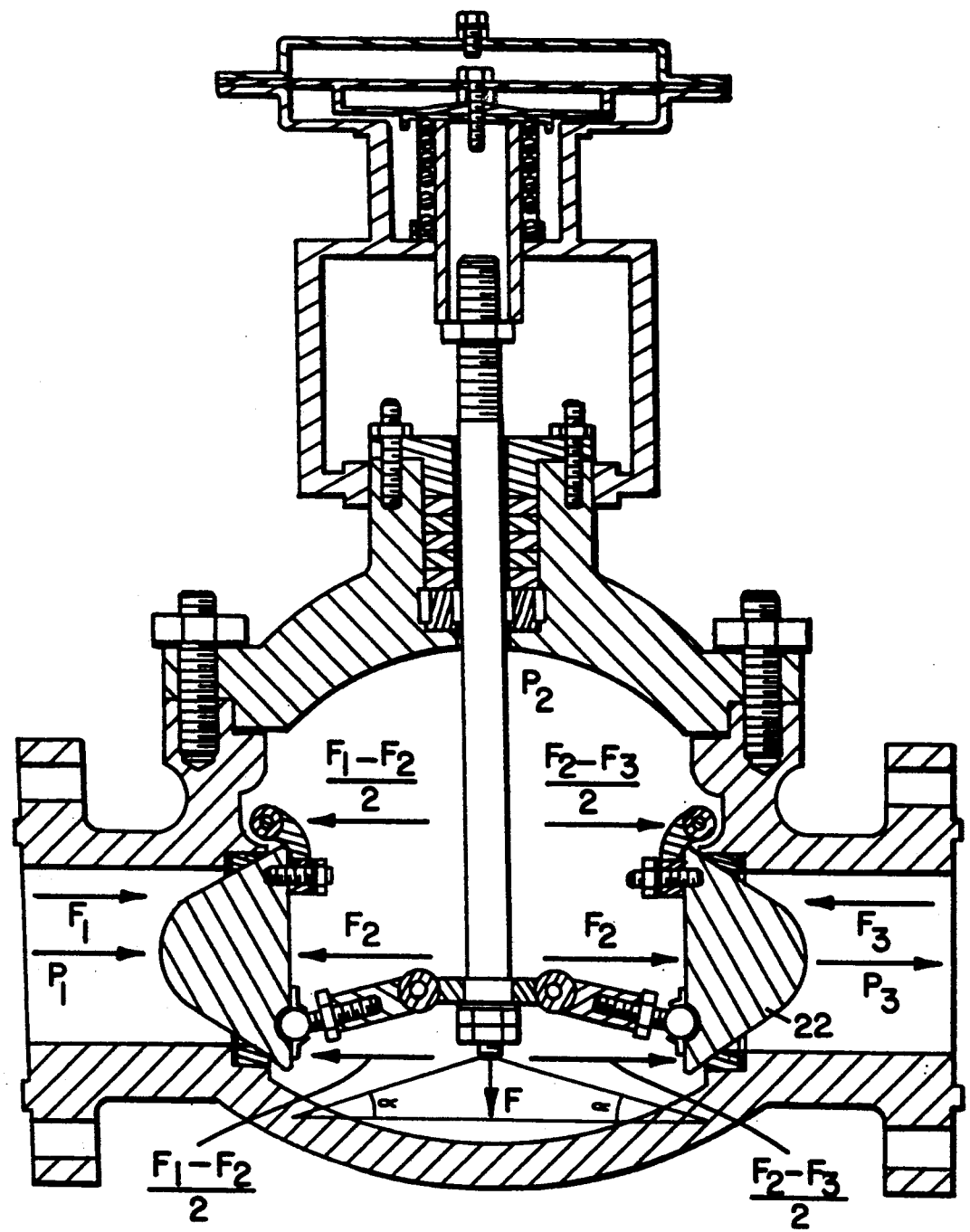
FIG. 3 is the valve of FIG. 1 indicating the forces acting thereon.

As can be seen in FIG. 3, providing two plugs 22 instead of one provides the further advantage that the force acting on stem 26 is substantially reduced compared to that acting ordinarily on the valve stem. Furthermore, in order to optimize the closing capability of the stem 26, it is preferable that the angle α defined between the axis of the stem and the axis of the coupling means 28 be above about 2°. The best range is between 2 and 15 degrees, the most preferred angle being about 6°.

Figure 4:
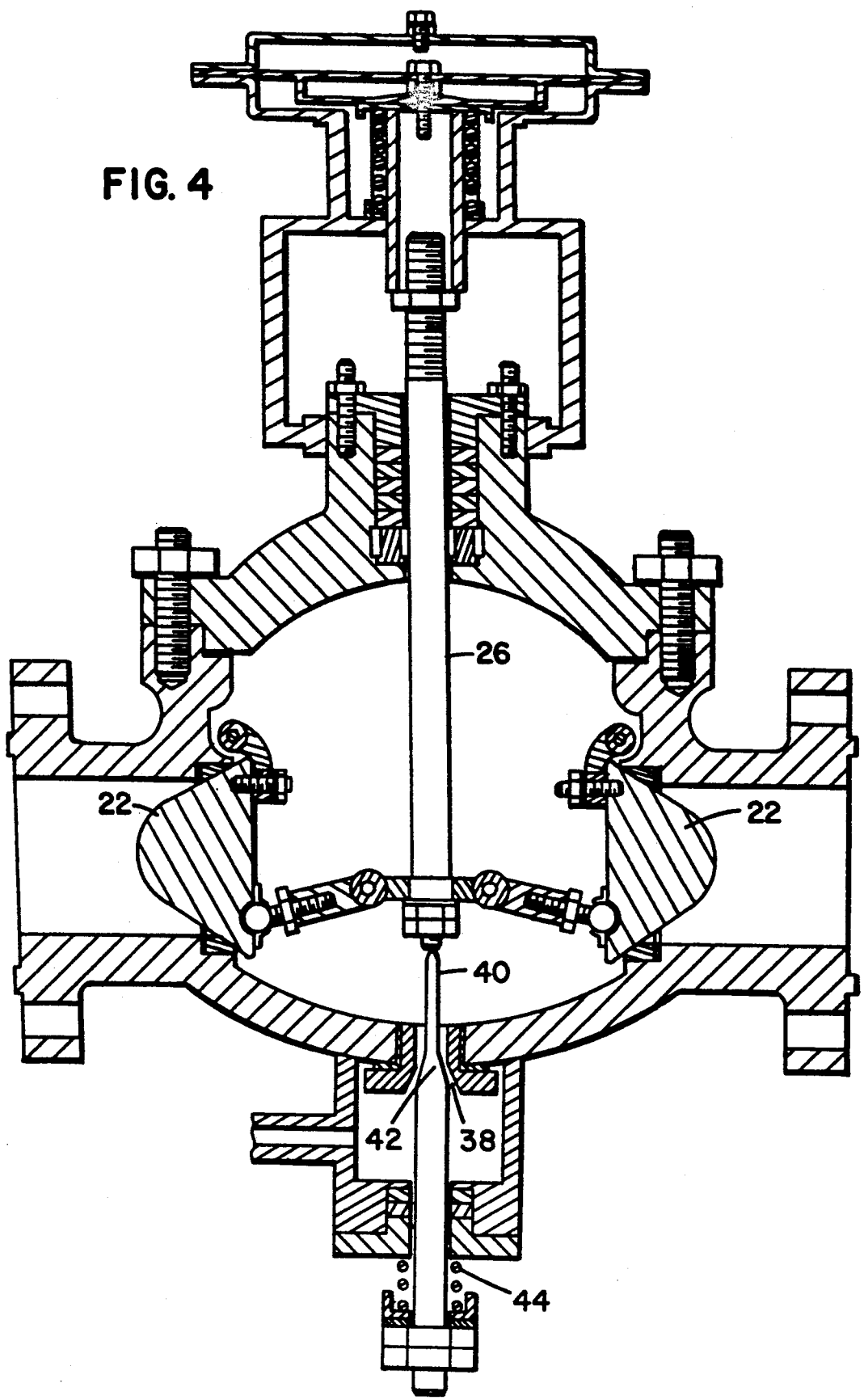
FIG. 4 is a sectional illustration of a control valve constructed and operative in accordance with an alternate embodiment of the invention.

Referring now to FIG. 4, there is shown a control valve constructed and operative in accordance with an alternate embodiment of the invention. The control valve is substantially similar to that of FIG. 1, like elements having like reference numerals. However, this embodiment is particularly useful in steam lines wherein water vapor tends to condense when there is substantially no through-flow (i.e., when the valve is closed). In this embodiment, a second stem 40 is provided disposed in an aperture 38 defined in the bottommost wall of housing 10 and arranged co-axially with stem 26. Stem 40 defines a sealing plug 42 arranged to seal aperture 38. Stem 40 is preferably spring-biased, with spring 44 urging plug 42 into the closed orientation, and is arranged to be pushed into the open orientation by stem 26 when the latter is at its maximum extension and plugs 22 are closed. When sealing plug 42 is open, gas and liquid from chamber 16 can drain out through aperture 38.

It will be appreciated that this embodiment of the invention can be utilized as a double block and bleed. Plugs 22 act as the double block and spring loaded stem 40 serves as the bleed. Thus, this embodiment of the invention provides a simple, efficient replacement for the complex conventional double block and bleed.

Figure 5:
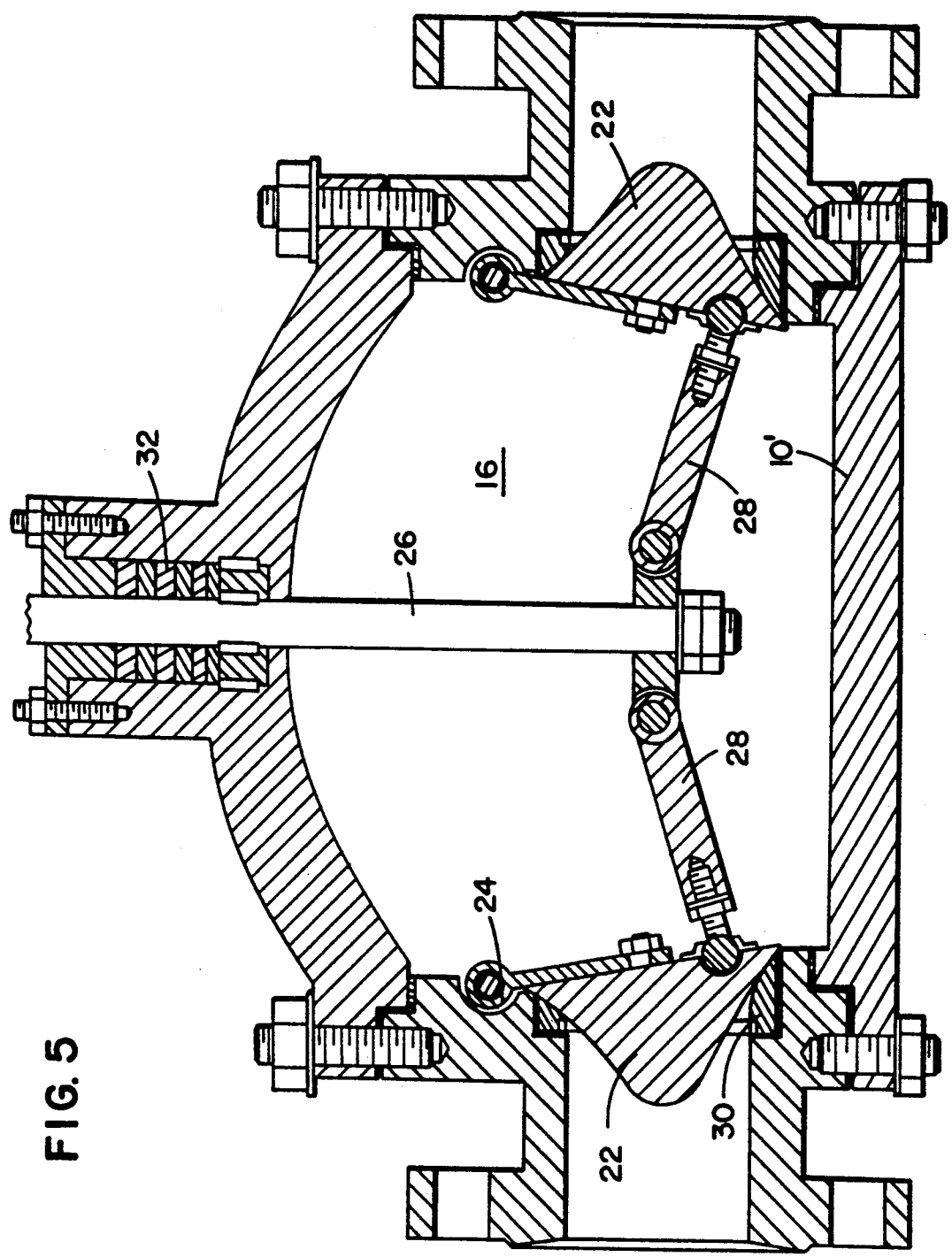
FIG. 5 is a sectional illustration of a control valve constructed and operative in accordance with another alternate embodiment of the invention.
Figure 6:
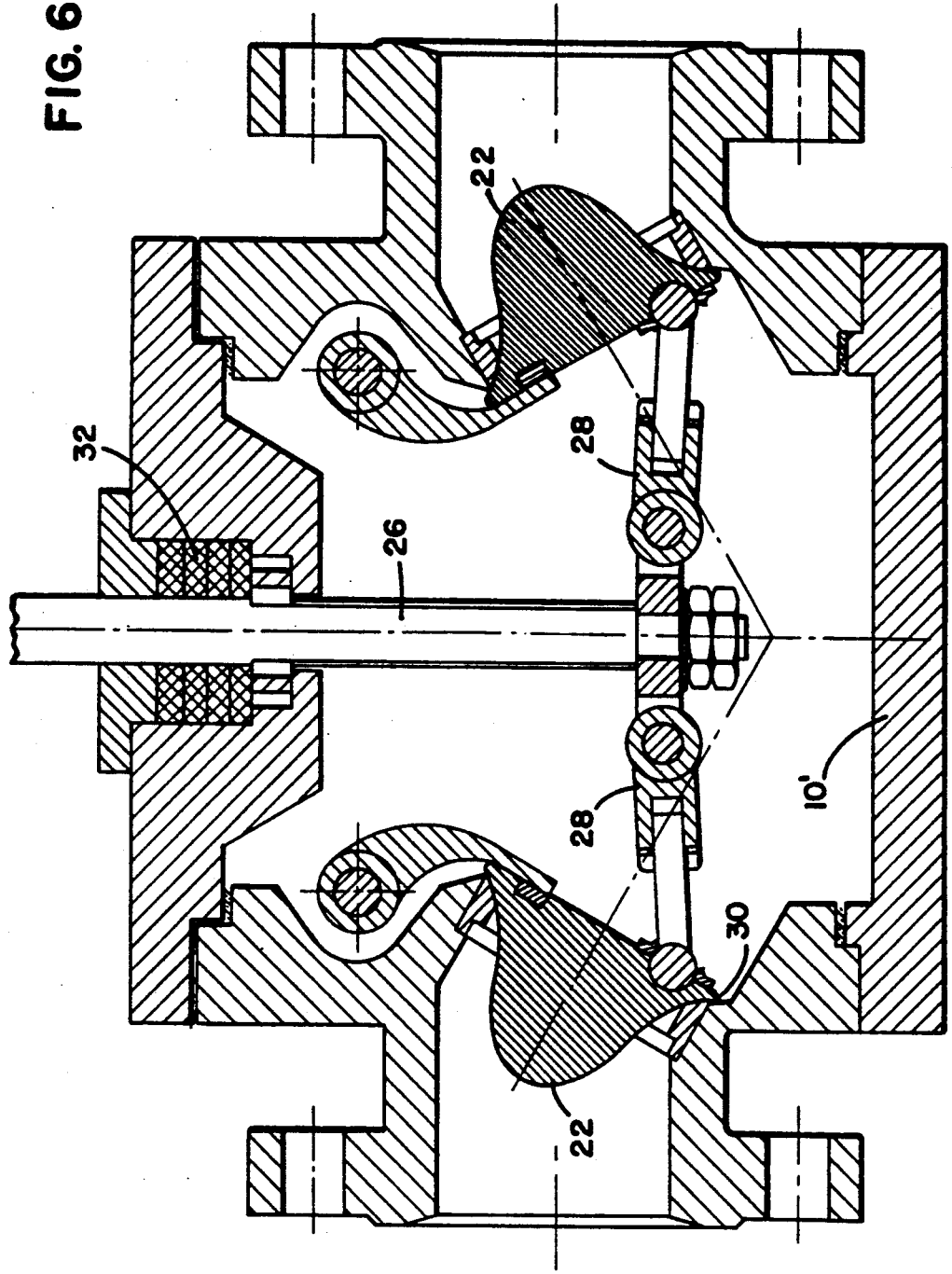
FIG. 6 is a sectional illustration of a control valve constructed and operative in accordance with yet another alternate embodiment of the invention.

FIGS. 5 and 6 show alternative embodiments of the present invention. Like elements in FIG. 1 have like reference numerals.

Figure 7:
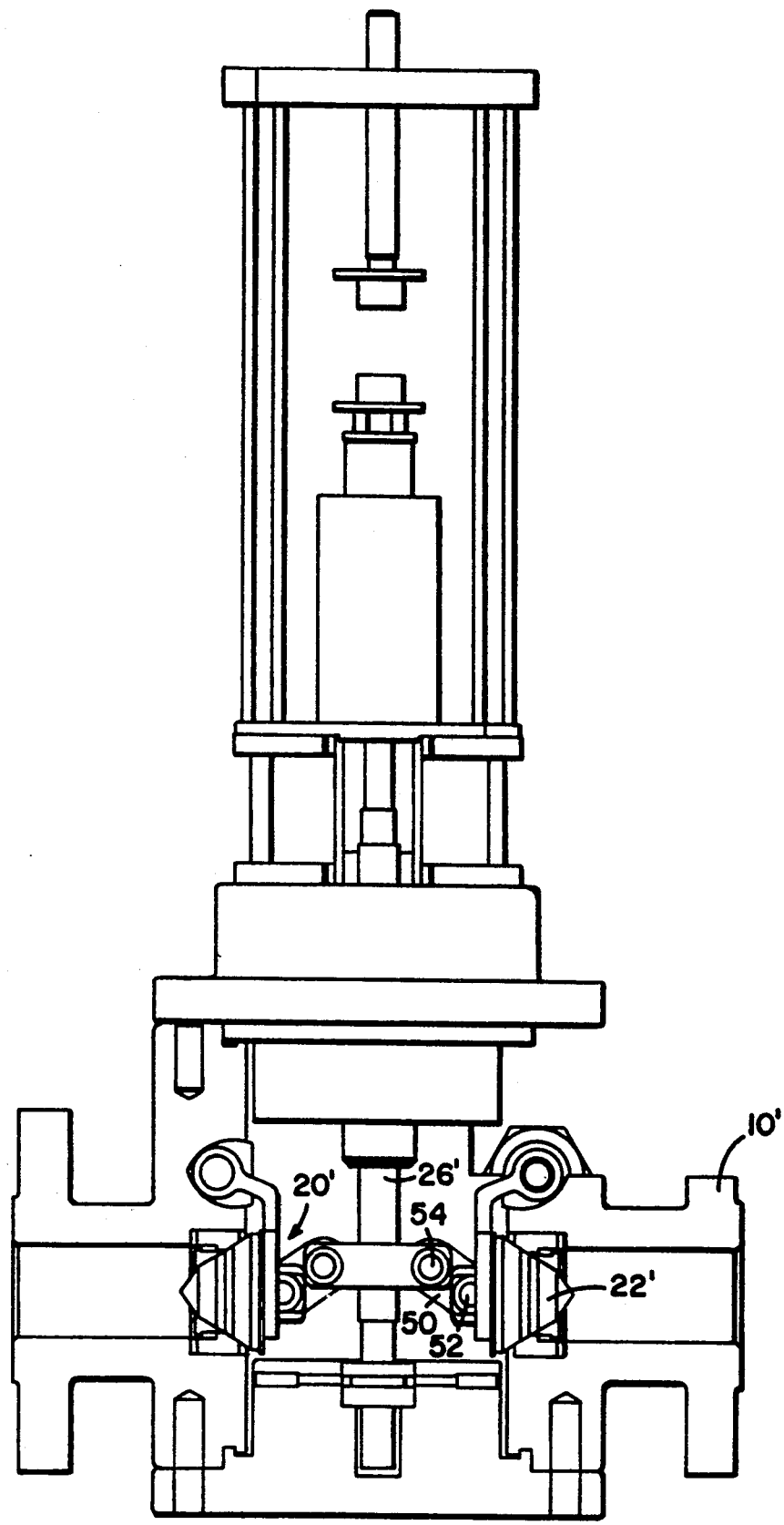
FIG. 7 is a sectional illustration of a control valve constructed and operative in accordance with a further alternate embodiment of the invention.

Referring now to FIG. 7 there is shown a sectional illustration of a control valve constructed and operative in accordance with another embodiment of the present invention and comprising a housing 10'. Housing 10' defines a fluid inlet 12 and a fluid outlet 14 with an expansion chamber 16 between the inlet and the outlet. Disposed for sealing engagement in each of inlet 12 and outlet 14 is a plug assembly 20'.

Each of plug assemblies 20' comprises a hard metal plug 22' pivotably affixed at one side thereof to housing 10' about an axis 24'. The opposite side is coupled as by coupling means 50 to the stem 26'. Coupling means 50 are pivotably coupled to plug 22' about a rotation axis 52 which preferably are located in the center of the plug, and are pivotably coupled to the stem 26' about a rotation axis 54.

The angle defined between the axis of stem 26' and the axis of coupling means 50 must be less than 45°. It will be appreciated that the larger the valve, the smaller will be the angle. In the embodiment of FIG. 7, the angle is about 35°.

Operation of this embodiment is substantially identical to that of FIG. 1.

It will be appreciated by those skilled in the art that the invention is not limited to what has been shown and described hereinabove. Rather, the invention is limited solely by the claims which follow.

We claim:

1. A fluid regulating and control valve for fluid conduction comprising:
   a housing defining a chamber having a fluid inlet and a fluid outlet, each of said inlet and outlet having a base proximate said chamber;
   two oppositely disposed convex aerodynamically shaped plug elements eccentrically and pivotally mounted to said housing, each of said plug elements adjacent one of said inlet and outlet for pivotal planar movement, and arranged for controlled opening of said inlet and outlet, said bases comprising recesses for receiving metal sealing rings replaceable from inside said valve for engaging each of said plug elements in a sealed position in said inlet and outlet; said sealing rings having surfaces for mating with said plug elements shaped complementary to said plug elements so as to allow controlled flow between said plugs and said sealing rings;
   said plug elements being further coupled eccentrically to a stem with length adjustable rigid couplings for pivotal motion, such that when the plug elements close the inlet and outlet, the angle between an axis of each of said adjustable couplings and an axis of said stem is below 45°; and
   said stem being arranged to move linearly in a direction perpendicular to the fluid flow through said inlet and outlet for simultaneous pivoting to said plug elements.

2. A regulating and control valve as in claim 1 wherein said housing further comprises a removable plate to provide access to the interior of said chamber opposite a valve 3. A regulating and control valve as in claim 2, wherein said removable plate comprises a well hole and said stem extends into said well hole.

4. A fluid control valve as in claim 1 including packing comprising graphite tape disposed about said stem.

5. A regulating and control valve for fluid conduction comprising:
   a housing defining a first chamber having a fluid inlet and fluid outlet, each of said inlet and outlet having a base proximae said first chamber and an aperture in the lowermost wall of said first chamber leading to a second chamber;
   two oppositely disposed convex aerodynamically shaped plug elements eccentrically and pivotally mounted to said housing, each of said plug elements adjacent one of said inlet and outlet for pivotal planar movement, and arranged for controlled opening of said inlet and outlet to provide flow regulation and control, said bases comprising recesses for receiving metal sealing rings replaceable from inside said valve for engaging each of said plug elements in a sealed position in said inlet and outlet; said sealing rings having surfaces for mating with said plug elements shaped complementary to said plug elements so as to allow controlled flow between the plugs and said sealing rings;
   said plug elements being further coupled eccentrically to a first stem with length adjustable rigid couplings for pivotal motion, such that when the plug elements close the inlet and outlet, the angle between an axis of each of said adjustable couplings and an axis of stem is below 45°;
   said first stem being arranged to move linearly in a direction perpendicular to fluid flow through said inlet and outlet for simultaneous planar pivoting of said plug elements;
   a second stem disposed in said aperture and said second chamber, arranged co-axially with said first stem to be in contact with said first stem when said plug elements are closed, said second stem defining a sealing plug arranged to seal said aperture when said plug elements are open and to open said aperture when said plug elements are closed, said second chamber arranged to collect drain fluids.

6. A fluid control valve as in claim 5, including packing comprising graphite tape disposed about said first stem.

* * * * *